3,474,122
PROCESS FOR PRODUCING HIGHER
ALKYLALUMINUMS
Eiichi Ichiki and Hirosuke Ryu, Niihama-shi, and
Yasuhiko Inoue, Saitama-ken, Japan, assignors to
Sumitomo Chemical Company, Ltd., Osaka,
Japan, a corporation of Japan
No Drawing. Filed Aug. 30, 1966, Ser. No. 575,966
Claims priority, application Japan, Sept. 1, 1965,
40/53,741
Int. Cl. C07f 5/06
U.S. Cl. 260—448　　　　　　　　　　　　　　7 Claims

ABSTRACT OF THE DISCLOSURE

Higher alkylaluminums are prepared by reacting a higher α-olefin of the formula $CH_2{=}CH_1R_2$, at a temperature of 90° to 180° C., with an isobutyl radical-containing aluminum compound of the formula $$Al(isoC_4H_9)_{3-m-n}(CH{-}CHR_1R_2)_mH_n$$

wherein $R_1$ and $R_2$ are each a member of the group consisting of saturated aliphatic radicals, alicyclic radicals, aromatic radicals and hydrogen atom, with the total number of carbon atoms in $R_1$ and $R_2$ in each reactant being from 3 to 20; $m$ is 2, 1 or 0; and $n$ is 1 or 2; while introducing an inert gas into the reaction mixture.

---

This invention relates to a process for producing higher alkylaluminums from isobutyl radical-containing alkylaluminums and higher α-olefins.

Methods for preparing higher alkylaluminums by boiling at about 120° C. isobutyl radical-containing alkylaluminums together with higher α-olefins, thereby separating isobutylene, have been known according to Angewandte Chemie, vol. 67, page 424 (1955), Annalen der Chemie, vol. 629, page 14 (1960) and United States Patent No. 2,835,689 (1958).

In accordance with these methods, however, higher alkylaluminums, in which no substantial isobutyl radicals had been left, were difficultly obtainable. That is, in the synthesized higher alkylaluminums, considerable amounts of isobutyl radicals bonded to aluminum had been left, and it was difficult to obtain high purity alkylaluminums in high yields. Therefore, when a higher alkylaluminum synthesized in the above manner is then subjected to, for example, oxidation and hydrolysis to produce a higher primary alcohol, the resulting higher primary alcohol inevitably suffer from such drawback that it contains isobutyl alcohol as impurities.

Further, in the above methods, the time required for the reaction is relatively long, and therefore, during the reaction, a part of the expensive higher α-olefin is undesirably converted, due to side reactions, into an internal olefin that is the olefin with internal double bond or into a compound having high boiling point and is thus consumed.

An object of the present invention is to provide a process for preparing higher alkylaluminums by reaction of higher α-olefins with isobutyl radical-containing alkylaluminums, according to which higher alkylaluminums substantially free from isobutyl radicals can be obtained and the consumption of higher α-olefins can be prevented.

Other objects will be apparent from the descriptions that follow.

The process of the present invention is characterized in that in the preparation of a higher alkylaluminum by reacting at an elevated temperature a higher α-olefin with an isobutyl radical-containing alkylaluminum either in the presence or absence of solvent, the reaction is effected while introducing an inert gas into the reaction liquid present in the heating zone.

The higher α-olefins to be used in the present invention are those represented by the general formula $$CH_2{=}CR_1R_2$$

wherein $R_1$ and $R_2$ are individually one member selected from the group consisting of saturated aliphatic radicals, alicyclic radicals, aromatic radicals and hydrogen atom, and the total number of carbon atoms of $R_1$ and $R_2$ is 3 to 20. Examples of those olefins are n-hexene-1, 2-methylpentene-1, 2-methylhexene-1, 2-ethylpentene-1, n-octene-1, 2-ethylhexene-1, 2-ethyl-4-methylpentene-1, 2,4,4-trimethylpentene-1, n-dodecene-1, n-tetracene-1, n-octadecene-1, n-eicosene, α-methylstyrene, and 4-vinyl cyclohexene-1. These olefins may be used either alone or in admixture.

The isobutyl radical-containing alkylaluminums employed in the present invention are compounds represented by the general formula $$Al(isoC_4H_9)_{3-m-n}R_mH_n$$

wherein R is a radical of the formula $-CH_2-CHR_1R_2$, where $R_1$ and $R_2$ are the same as in the case of said higher α-olefins; $m$ is 2, 1 or 0; and $n$ is 1 or 0, the sum of $m$ and $n$ being not more than 2. Examples of these alkylaluminums are triisobutylaluminum, diisobutylaluminum hydride, diisobutyl n-dodecyclaluminum, isobutyl 2-ethylhexylaluminum hydride, diisobutyl 2-ethylhexylaluminum and isobutyl di(2-ethylhexyl)aluminum. These compounds may be used either alone or in admixture.

Inert gases usable in the present invention are those which do not react with said higher α-olefins and alkylaluminums and are stable by themselves, such as argon, nitrogen, hydrogen, methane, ethane, propane or butane. If active materials, such as oxygen, steam, carbon dioxide or sulfur dioxide, are contained in said inert gases, they react with alkylaluminums to form undesirable by-products. Therefore, these active materials should have been removed previously.

When the inert gas is introduced into the reaction liquid present in a heating zone, the amount of isobutyl radical remaining in the resulting higher alkylaluminum is greatly reduced. In addition, the reaction time is shortened, and the internal isomerization of higher α-olefin to internal olefin and the formation of by-product having high boiling point are markedly lowered. This is considered ascribable to the fact that, by the introduction of inert gas into the reaction liquid, isobutylene present in the reaction liquid is quickly excluded out of the reaction system, with the result that the isobutylene-releasing reaction of the starting material alkylaluminum is effectively accelerated.

In such higher alkylaluminum production, the released isobutylene may be recovered and recycled for the synthesis of starting alkylaluminum. However, in case the feed rate of inert gas is more than 0.5 mole/min. per mole of alkylaluminum present in the reaction liquid, the recovery of isobutylene taken out together with inert gas becomes difficult. On the other hand, in case the feed rate of inert gas is less than 0.005 mole/min. per mole of alkylaluminum, the reaction rate is lowered and no effect of inert gas introduction can be exhibited, in practice.

Therefore, the feed rate of inert gas is preferably within the range of from 0.005 to 0.5 mole/min. per mole of alkylaluminum present in the reaction liquid.

In the practice of the present invention, the mixing proportions of higher α-olefins and isobutyl radical-containing alkylaluminums are varied depending on the amounts of isobutyl radical and hydrogen atom present in the starting alkylaluminums. That is, one equivalent of isobutyl radical present in a starting alkylaluminum brings about a displacement reaction with one equivalent of higher α-olefin, and one equivalent of higher α-olefin adds to one equivalent of hydrogen atom. Therefore, the amount of higher α-olefin may be at least a theoretical amount based on the amount of isobutyl radical and hydrogen atom in the starting alkylaluminum. For example, in case tri-n-octylaluminum is produced from triisobutylaluminum (3 equivalents of isobutyl radical is present in one mole) or diisobutylaluminum hydride (one equivalent of hydrogen atom and 2 equivalents of isobutyl radical are present in one mole) and n-octene-1, the amount of n-octene-1 may be 3 moles per mole of triisobutylaluminum or diisobutylaluminum hydride. At the reaction temperature, a part of the resulting tri-n-octylaluminum is decomposed, and the dioctylaluminum hydride and n-octene-1 are brought into an equilibrium state. Therefore, in order to obtain tri-n-octylaluminum having no isobutyl radical and containing substantially no hydride, the amount of n-octene-1 is desirably a little excess. On the other hand, in case tri-n-octylaluminum is prepared from diisobutyl-n-octylaluminum (2 equivalents of isobutyl radical is present in one mole) and n-octene-1, the amount of n-octene-1 may be 2 moles per mole of diisobutyl-n-octylaluminum, but is desirably somewhat excess for the above reason. The excess n-octene-1 can be reused after separation from the reaction products.

In practicing the present invention, a mixture of higher α-olefin and isobutyl radical containing alkylaluminum may be reacted without solvent. Alternatively, however, the mixture may be reacted in the presence of a solvent in order to control the boiling point or viscosity of the reaction mixture or to facilitate the separation of reaction product from excess α-olefin. Preferable solvents are hydrocarbons inert to higher α-olefins and alkylaluminums, such as heptane, octane, nonane, decane, dodecane, octadecane, toluene, xylene and cumene.

The reaction temperature to be adopted in the present invention may be any temperature at which the isobutylene is substantially released from the isobutyl radical-containing alkylaluminum. Ordinarily, the release of isobutylene is observed at about 80° C., and the releasing rate becomes greater with increasing temperature. On the other hand, however, the alkylaluminum present in the reaction system decomposes as the temperature increases and tends to liberate aluminum. Therefore, the reaction temperature is desirably within the range of from 90 to 189° C. Accordingly, in the case where such an olefin having low boiling point as n-hexene-1 (B.P. 63.4° C.) is used, the reaction system is required to be pressurized to a certain extent to maintain the reaction temperature within said range.

The process of the present invention is easily practicable on commercial scale, and is characterized in that no substantial isobutyl radical is left in the resulting alkylaluminum, the expensive starting higher α-olefins are prevented from loss due to isomerization reaction and reaction of formation of by-products having high boiling point, and the utilization ratio of both aluminum content and higher α-olefin of the starting material are high. Therefore, when used for the production of, for example, higher primary alcohols, the higher alkylaluminums obtained in accordance with the process of the present invention can give high purity higher primary alcohols substantially free from isobutyl alcohol. Further, the higher alkylaluminums prepared according to the present process are high in purity and hence can be used, without trouble, in various other industrial fields.

Now, the present invention will be fully illustrated below with reference to examples, in each of which the amount of isobutyl radical left in the resulting alkylaluminum is represented by the percentage of the equivalent number of residual total isobutyl radical based on the equivalent number of the resulting total alkylaluminum, (1 mole of alkylaluminum corresponds to 3 equivalents).

Example 1

A 1 l. four-necked flask provided with a thermometer, a stirrer, a reflux condenser and a gas bubble-forming tube reaching the bottom of the flask, was flushed with a nitrogen gas and was maintained in an inert gas atmosphere. To the flask were fed 198 g. (1 mole) of triisobutylaluminum and 448 g. (4 moles) of n-octene-1, and the mixture was heated to 120° C., while introducing a nitrogen gas at a rate of 0.06 mole/min. Initially, the reflux of n-octene-1 vigorously occurred with the generation of isobutylene gas but the reflux became greatly reduced before long. After 60 minutes, no change was observed anymore in the state of reaction, and therefore the mixture was immediately cooled and excess n-octene-1 was separated. The resulting alkylaluminum and the separated n-octene-1 were analyzed to find that 1.1% of isobutyl radical had been left in the alkylaluminum, and of the fed n-octene-1, 2.2% had been converted into an internal olefin and 0.6% into components having high boiling points.

For comparison, the above reaction was repeated without introduction of nitrogen gas. When the mixture was heated to 120° C., the reflux of n-octene-1 vigorously occurred with the generation of isobutylene gas, but lowered before long. After 180 minutes, no generation of isobutylene gas was observed, and therefore the mixture was immediately cooled and excess n-octene-1 was separated. The resulting alkylaluminum and the separated n-octene-1 were analyzed, like in the above, to find that 13.5% of isobutyl radical had been left in the alkylaluminum and, of the fed n-octene-1, 6.0% had been converted into an internal olefin and 2.0% into components having high boiling points.

Example 2

A 1 l. autoclave provided with a thermometer, a stirrer, a reflux condenser connected to a means capable of withdrawing a gas at 5 atm., and a gas bubble-forming tube reaching the bottom of the autoclave through a pressure quantitative pump was flushed with a nitrogen gas and was maintained in an inert gas atmosphere. To the autoclave were fed 198 g. (1 mole) of triisobutylaluminum and 336 g. (4 moles) of n-hexene-1, and the mixture was heated to 120° C. while introducing nitrogen gas at a rate of 0.06 mole/min. After 90 minutes, the mixture was cooled and excess n-hexene-1 was separated. The resulting alkylaluminum and the separated n-hexene-1 were analyzed to find that 2.8% of isobutyl radical had been left in the alkylaluminum and, of the fed n-hexene-1, 3.0% had been converted into an internal olefin and 1.2% into components having high boiling points.

For comparison, the above reaction was repeated without introduction of nitrogen gas. At the time when the mixture was heated to 120° C., the generation of isobutylene gas vigorously occurred, but after 250 minutes, no generation of isobutylene gas was observed. Therefore, the mixture was immediately cooled and excess n-hexene-1 was separated. The resulting alkylaluminum and separated n-hexene-1 were analyzed, like in the above, to find that 25.1% of isobutyl radical had been left in said alkylaluminum and, of the fed n-hexene-1, 9.2% was converted into an internal olefin and 2.7% into components having high boiling points.

Example 3

A 300 cc. four-necked flask provided with a thermometer, a stirrer, a reflux condenser connected to a gas reservoir and a gas bubble-forming tube reaching the bottom of the flask was flushed with a nitrogen gas and was maintained in an inert gas atmosphere. To the flask were fed 57 g. (0.4 mole) of diisobutylaluminum hydride and 173 g. (1.6 moles) of 4-vinylcyclohexene-1, and the mixture was heated to 120° C., while introducing a nitrogen gas at a rate of 0.024 mole/min. Initially, the reflux of 4-vinylcyclohexene-1 vigorously occurred with the generation of isobutylene gas, but the reflux greatly lowered before long. After 80 minutes, no change was observed anymore in the state of reaction, and therefore the mixture was immediately cooled and excess 4-vinylcyclohexene-1 was separated. The resulting alkylaluminum and the separated 4-vinylcyclohexene-1 were analyzed to find that 1.2% of isobutyl radical had been left in the alkylaluminum and 0.3% of components having high boiling points had been formed in the fed 4-vinylcyclohexen-1, though little change was observed in the vinyl radical thereof.

For comparison, the above reaction was repeated without introduction of nitrogen gas. At the time when the mixture was heated to 120° C., the reflux of 4-vinylcyclohexene-1 vigorously occurred with the generation of isobutylene gas but lowered before long. After 200 minutes, no generation of isobutylene gas was observed anymore, and therefore the mixture was immediately cooled and excess 4-vinylcyclohexene-1 was separated. The resulting alkylaluminum and the separated 4-vinylcyclohexene-1 were analyzed to find that 14.1% of isobutyl radical had been left in the alkylaluminum and, 0.7% of the fed 4-vinylcyclohexene-1 had been converted into components having high boiling points, though little loss of the vinyl radical thereof was observed.

Example 4

A 500 cc. four-necked flask provided with a thermometer, a stirrer, a reflux condenser and a gas bubble-forming tube reaching the bottom of the flask was flushed with a nitrogen gas and was maintained in an inert gas atmosphere. To the flask were fed 93 g. (0.3 mole) of diisobutyl-dodecyclaluminum, 151 g. (0.9 mole) of n-dodecene-1 and 46 g. (0.5 mole) of toluene, and the mixture was heated to 120° C., while introducing a nitrogen gas at a rate of 0.018 mole/min. Initially, the reflux of toluene vigorously occurred with the generation of isobutylene gas, but the reflux somewhat lowered before long. After 100 minutes, no change was observed anymore in the state of reaction, and therefore the mixture was immediately cooled and excess n-dodecene-1 and toluene were separated. The resulting alkylaluminum and the separated n-dodecene-1 were analyzed to find that 0.8% of isobutyl radical had been left in the alkylaluminum and, of the fed n-dodecene-1, 3.0% had been converted into an internal olefin and 1.1% into components having high boiling points.

For comparison, the above reaction was repeated without introduction of nitrogen gas. When the mixture was heated to 120° C., the reflux of toluene did not occur so vigorously, and the generation of isobutylene gas ceased in 300 minutes. Therefore, the mixture was immediately cooled and excess n-dodecene-1 and toluene were separated. The resulting alkylaluminum and the separated n-dodecene-1 were analyzed to find that 10.2% of isobutyl radical had been left in the alkylaluminum and, of the fed n-dodecene-1, 6.5% had been converted to an internal olefin and 2.7% into components having high boiling points.

Example 5

The same flask as in Example 1 was flushed with a nitrogen gas and was maintained in an inert gas atmosphere. To the flask were fed 218 g. (1.1 moles) of triisobutylaluminum, and 493 g. (4.4 moles) of an α-olefin mixture comprising 70% of 2-ethylhexene-1 and 30% of 2-ethyl-4-methylpentene-1, and the resulting mixture was heated to 120° C., while introducing a nitrogen gas at a rate of 0.066 mole/min. Initially, the reflux of mixture vigorously occurred with the generation of isobutylene gas, but the reflux amount gradually lowered and, after 70 minutes, no change in the reaction was observed. Therefore, the mixture was immediately cooled and then excess α-olefin mixture was separated. The resulting alkylaluminum and the separated α-olefin mixture were analyzed to find that 1.0% of isobutyl radical had been left in the alkylaluminum and, of the fed α-olefin mixture, 1.0% had been converted into an internal olefin and 0.7% into components having high boiling points.

For comparison, the above reaction was repeated without introduction of nitrogen gas. When the mixture was heated to 120° C., there initially occurred vigorous reflux and the generation rate of isobutylene gas was also high, but, before long, the reflux became reduced and, after 200 minutes, the generation of isobutylene gas was not observed. Therefore, the reaction mixture was immediately cooled and excess α-olefin mixture was separated. The resulting alkylaluminum and the separated α-olefin mixture were analyzed to find that 14.1% of isobutyl radical had been left in the alkylaluminum and, of the fed α-olefins, 3.1% had been converted into internal olefins and 1.5% into components having high boiling points.

Example 6

In this example was used the same flask as in Example 1, except that a separator for isobutylene gas was connected to the gas outlet of the reflux condenser so that the inert gas after separation could be again introduced into the gas bubble-forming tube by means of a quantitative pump. The flask was flushed with a nitrogen gas and was maintained in an inert gas atmosphere. To the flask were fed 158 g. (0.8 mole) of triisobutylaluminum and 736 g. (3.2 moles) of an α-olefin mixture comprising n-dodecene-1, n-tetradecene-1, n-hexadecene-1, n-octadecene-1 and n-eicosene-1 (average molecular weight 230), and the resulting mixture was heated to 120° C., while introducing and recycling a nitrogen gas at a rate of 0.048 mole/min.

The condensation of isobutylene vigorously occurred initially but ceased before long. Therefore, the reaction was terminated in 80 minutes and the mixture was immediately cooled. The resulting alkylaluminum was difficulty separable from excess α-olefins and hence was analyzed in the form of mixture to find that 0.9% of isobutyl radical had been left in the produced alkylaluminum and, of the fed α-olefins, 2.5% had been converted into internal olefins and 0.7% into components having high boiling points.

For comparison, the above reaction was repeated without introduction of nitrogen gas. The mixture was heated at 120° C., and after 250 minutes, no generation of isobutylene gas was observed anymore. The mixture was immediately cooled and was analyzed in the same manner as above to find that 13.0% of isobutyl radical had been left in the resulting alkylaluminum and, of the fed α-olefins, 6.0% had been converted into internal olefins and 2.1% into components having high boiling points.

Example 7

The same flask as in Example 3 was flushed with a nitrogen gas and was maintained in an inert gas atmosphere. To the flask were fed 57 g. (0.4 mole) of diisobutylaluminum hydride and 189 g. (1.6 moles) of α-methylstyrene, and the mixture was heated to 120° C., while introducing a nitrogen gas at a rate of 0.024 mole/min. Initially, more or less reflux was observed with the generation of isobutylene gas, but the reflux lowered before long. After 80 minute, no change was observed in the state of reaction, and therefore the mixture was immediately cooled and excess α-methylstyrene was separated. The resulting alkylaluminum and the separated α-methylstyrene were analyzed to find that 1.1% of isobutyl radical had been left in the alkylaluminum and the side chain double bonds of the fed α-methylstyrene had scarcely changed but 0.3% thereof had been converted into components having high boiling points.

For comparison, the above reaction was repeated without introduction of nitrogen gas. When the mixture was heated to 120° C., the reflux of α-methylstyrene occurred with the generation of isobutylene gas, but the reflux became reduced before long and, after 200 minutes, no generation of isobutylene gas was observed anymore. Therefore, the mixture was immediately cooled and excess α-methylstyrene was separated. The resulting alkylaluminum and the separated α-methylstyrene were analyzed to find that 14.0% of isobutyl radical had been left in the alkylaluminum and the side chain double bonds of the fed α-methylstyrene had scarcely changed but 0.7% thereof had been converted into components having high boiling points.

What we claim is:

1. A process for producing higher alkylaluminums which comprises reacting at an elevated temperature a higher α-olefin represented by the general formula $$CH_2=CR_1R_2$$

wherein $R_1$ and $R_2$ are respectively one member selected from the group consisting of saturated aliphatic radicals, alicyclic radicals, aromatic radicals and hydrogen atom and the total number of carbon atoms of $R_1$ and $R_2$ is from 3 to 20, with an isobutyl radical-containing alkylaluminum represented by the general formula $$Al(iso\ C_4H_9)_{3-m-n}R_mH_n$$

wherein R is a radical of the formula $—CH_2—CHR_1R_2$, where $R_1$ and $R_2$ are the same as in the case of said higher α-olefin; $m$ is 2, 1 or 0; and $n$ is 1 or 0, the sum of $m$ and $n$ being not more than 2, while introducing an inert gas in the proportion within the range of from 0.005 to 0.5 mole/min. per mole of the alkylaluminum present into the reaction liquid in the heating zone.

2. A process according to claim 1, wherein the inert gas is selected from the group consisting of argon, nitrogen, hydrogen, methane, ethane, propane and butane.

3. A process according to claim 1, wherein the higher α-olefin is selected from the group consisting of n-hexene-1, 2-methylpentene-1, 2-methylhexene-1, 2-ethylpentene-1, n-octene-1, 2-ethylhexene-1, 2-ethyl-4-methylpentene-1, 2,4,4-trimethylpentene-1, n-dodecene-1, n-tetracene-1, n-octadecene-1, n-eicosene-1, α-methylstyrene and 4-vinylcyclohexene-1.

4. A process according to claim 1, wherein the starting alkylaluminum is selected from the group consisting of triisobutylaluminum, diisobutylaluminum hydride, diisobutyl n-dodecylaluminum, isobutyl 2-ethylhexylaluminum hydride, diisobutyl 2-ethylhexylaluminum, and isobutyl di(2-ethylhexyl)aluminum.

5. A process according to claim 1, wherein the reaction is effected at a temperature within the range of from 90° to 180° C.

6. A process according to claim 1, wherein the reaction is effected in the presence of a solvent.

7. A process according to claim 6 wherein the solvent is selected from the group consisting of heptane, octane, nonane, decane, dodecane, octadecane, toluene, xylene and cumene.

References Cited

UNITED STATES PATENTS

| | | |
|---|---|---|
| 2,835,689 | 5/1958 | Ziegler et al. |
| 2,959,607 | 11/1960 | Werber et al. |
| 2,976,306 | 3/1961 | Walde. |
| 3,014,941 | 12/1961 | Walsh. |
| 3,038,922 | 6/1962 | Snyder. |
| 3,154,594 | 10/1964 | Levine. |
| 3,282,974 | 11/1966 | Bruno et al. |

OTHER REFERENCES

Ziegler et al.; Annalen Der Chemie, vol. 629, pp. 14 to 16 (1960).

Ziegler et al.; Annalen Der Chemie, vol. 589, pp. 99–105 (1954).

Natta et al.; J. Amer. Chem. Soc. vol. 81, pp. 2561–63 (1959).

TOBIAS E. LEVOW, Primary Examiner

H. M. S. SNEED, Assistant Examiner